US012686622B2

(12) United States Patent
Montoya et al.

(10) Patent No.: US 12,686,622 B2
(45) Date of Patent: Jul. 21, 2026

(54) CALCIUM RUTHENATE COMPOSITION OF MATTER AND CALCIUM RUTHENATE CATALYSTS

(71) Applicant: Toyota Research Institute, Inc., Los Altos, CA (US)

(72) Inventors: Joseph Harold Montoya, Berkeley, CA (US); Muratahan Aykol, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1269 days.

(21) Appl. No.: 17/537,750

(22) Filed: Nov. 30, 2021

(65) Prior Publication Data

US 2023/0166984 A1 Jun. 1, 2023

(51) Int. Cl.
| | |
|---|---|
| *C25B 1/04* | (2021.01) |
| *C01G 55/00* | (2006.01) |
| *H01M 4/90* | (2006.01) |
| *C25B 11/077* | (2021.01) |

(52) U.S. Cl.
CPC ........ *C01G 55/002* (2013.01); *H01M 4/9033* (2013.01); *C01P 2002/02* (2013.01); *C01P 2002/50* (2013.01); *C01P 2006/40* (2013.01); *C25B 1/04* (2013.01); *C25B 11/0773* (2021.01)

(58) Field of Classification Search
CPC .... H01M 4/9033; C25B 11/0773; C25B 1/04; C25B 11/052; C25B 11/077; C01P 2006/40; C01P 2002/02; C01P 2002/50; C01P 2002/72; C01G 55/002; C01G 55/00; B01J 37/031; B01J 37/0201
See application file for complete search history.

(56) References Cited

U.S. PATENT DOCUMENTS

| | | |
|---|---|---|
| 3,055,840 A | 9/1962 | Koch et al. |
| 3,907,968 A | 9/1975 | Kobylinski et al. |

OTHER PUBLICATIONS

Persson (NPL: Materials Data on NaCa3RuO6 by Materials Project, published 2020).*
Davis et al (NPL:High Temperature flux growth, structural characterization and magnetic properties of Ca3. 15Li0.85IrO6, Sr3LiIrO6, Ca3LiRuO6 and Sr3LiRuO6, Journal of alloys and compounds, vol. 351, issue 1-2, Mar. 10, 2003, pp. 95-100).*
Mills (CN103460469, machine translation), published 2013.*
Halwidl, D. et al., "A full monolayer of superoxide: oxygen activation on the unmodified Ca3Ru2O7(001) surface", J. Mater. Chem. A, 2018, 6, pp. 5703-5713 (11 pages).

(Continued)

*Primary Examiner* — Smita S Patel
(74) *Attorney, Agent, or Firm* — Christopher G. Darrow; Darrow Mustafa PC

(57) ABSTRACT

A calcium ruthenate composition of matter includes a compound of calcium, ruthenium and oxygen with a chemical formula of $Ca_aRu_bO_c$ and with 'a' greater than or equal to 2.75 and less than or equal to 3.25, 'b' greater than or equal to 0.75 and less than or equal to 1.25, and 'c' greater than or equal to 5.75 and less than or equal to 6.25. The $Ca_aRu_bO_c$ is an oxygen evolution reaction catalyst, an oxygen reduction reaction catalyst, and/or a catalyst for the hydrolysis of a hydrogen containing compound.

20 Claims, 4 Drawing Sheets

(56) References Cited

OTHER PUBLICATIONS

Badding, C. et al., "Metal Ruthenate Perovskites as Heterogeneous Catalysts for the Hydrolysis of Ammonia Borane", ACS Omega, 2018, 3, pp. 3501-3506 (6 pages).

Mao, Z., "Studies of Novel Quantum Phenomena in Ruthenates", Tulane University, DOE Final Report, DOE award #DE-FG02-07ER46358, Apr. 5, 2011 (11 pages).

Montoya, J.H. et al., "Autonomous intelligent agents for accelerated materials discovery," Chemical Science 11 (32), (2020), pp. 8517-8532.

* cited by examiner

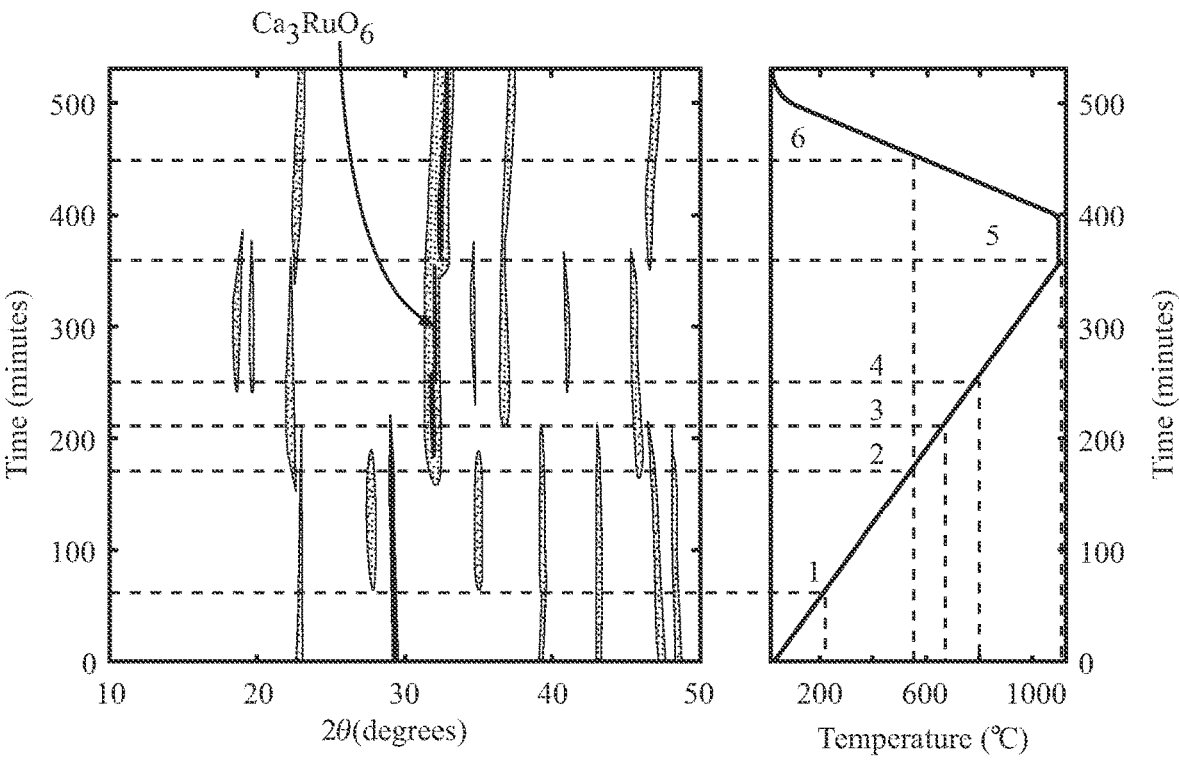
FIG. 3
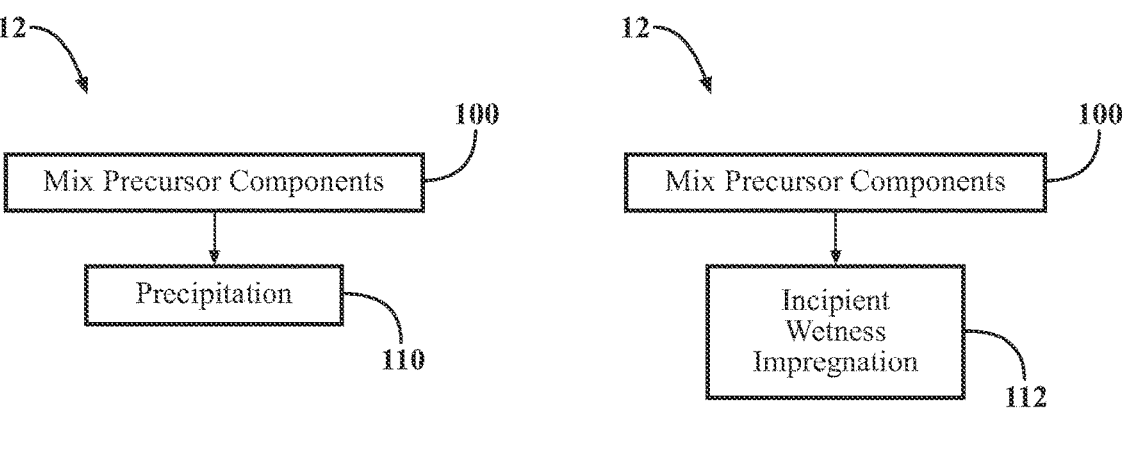
FIG. 4                    FIG. 5

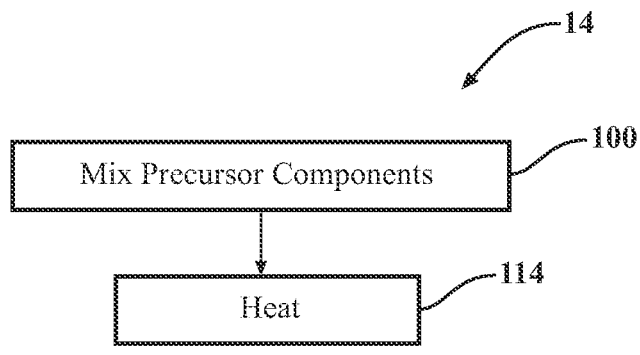
FIG. 6
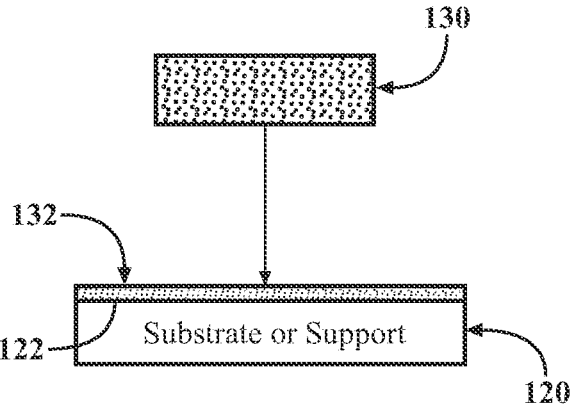
FIG. 7A
FIG. 7B

CALCIUM RUTHENATE COMPOSITION OF MATTER AND CALCIUM RUTHENATE CATALYSTS

TECHNICAL FIELD

The present disclosure relates generally to a composition of matter and particularly to a calcium ruthenate composition of matter.

BACKGROUND

Catalysts, i.e., catalytic materials, increase the rate (i.e., rate of reaction) of one or more chemical reactions and are used extensively in the production of energy and chemicals. In addition, catalysts are typically divided into two main classes, i.e., catalysts disposed in the same phase as the reactants and known as homogenous catalysts, and catalysts that are not in the same phase as the reactants and known as heterogeneous catalysts (e.g., a solid catalytic material used for catalysis of liquid and/or gas reactants).

Most heterogeneous catalysts are solids and include materials such as zeolites, alumina, transition metal oxides, and precious metals (e.g., platinum). For example, ruthenium oxides such as $Ca_3Ru_2O_7$, $CaRuO_3$, $SrRuO_3$, $Ca_2LaRuO_6$, $SrCoRuO_6$, and $SrLaCoRuO_6$ have been studied and/or investigated for the hydrolysis of ammonia borane and the activation of oxygen in the oxygen reduction reaction. However, such ruthenium oxides have limitations with respect to cost, catalytic activity, and/or catalytic activity after storage.

The present disclosure addresses issues related to ruthenium oxide catalysts, and other issues related to heterogeneous catalysts.

SUMMARY

This section provides a general summary of the disclosure, and is not a comprehensive disclosure of its full scope or all of its features.

In one form of the present disclosure, a calcium ruthenate composition of matter includes a compound of calcium, ruthenium and oxygen having a chemical formula of $Ca_aRu_bO_c$ with 'a' greater than or equal to 2.5 and less than or equal to 3.5, 'b' greater than or equal to 0.5 and less than or equal to 1.5, and 'c' greater than or equal to 5.5 and less than or equal to 6.5.

In another form of the present disclosure, a catalyst includes a compound of calcium, ruthenium and oxygen having a chemical formula of $Ca_aRu_bO_c$ with 'a' greater than or equal to 2.5 and less than or equal to 3.5, 'b' greater than or equal to 0.5 and less than or equal to 1.5, and 'c' greater than or equal to 5.5 and less than or equal to 6.5.

In still another form of the present disclosure, a catalysts includes a catalyst support and a compound of calcium, ruthenium and oxygen disposed on a surface of the catalyst support. The compound of calcium, ruthenium and oxygen has a chemical formula of $Ca_aRu_bO_c$ with 'a' greater than or equal to 2.5 and less than or equal to 3.5, 'b' greater than or equal to 0.5 and less than or equal to 1.5, and 'c' greater than or equal to 5.5 and less than or equal to 6.5.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 3 is an image of XRD scans as a function of temperature for the calcium ruthenate $Ca_aRu_bO_c$ according to the teachings of the present disclosure;

FIG. 4 is a flow chart for a method of making the calcium ruthenate $Ca_aRu_bO_c$ according to the teachings of the present disclosure;

FIG. 5 is a flow chart for another method of making the calcium ruthenate $Ca_aRu_bO_c$ according to the teachings of the present disclosure;

FIG. 6 is a flow chart for still another method of making the calcium ruthenate $Ca_aRu_bO_c$ according to the teachings of the present disclosure;

FIG. 7A shows a technique for applying the calcium ruthenate $Ca_aRu_bO_c$ according to the teachings of the present disclosure to a catalyst support;

FIG. 7B shows another technique for applying the calcium ruthenate $Ca_aRu_bO_c$ according to the teachings of the present disclosure to a catalyst support;

DETAILED DESCRIPTION

The present disclosure provides a calcium ruthenate composition of matter (calcium ruthenate). The calcium ruthenate has a chemical formula of $Ca_aRu_bO_c$ with the 'a' coefficient being greater than or equal to 2.5 and less than or equal to 3.5 (i.e., $2.5 \leq a \leq 3.5$), the 'b' coefficient being greater than or equal to 0.5 and less than or equal to 1.5 (i.e., $0.5 \leq b \leq 1.5$), and/or the 'c' coefficient being greater than or equal to 5.5 and less than or equal to 6.5 (i.e., $5.5 \leq c \leq 6.5$). In some variations, 'a' is greater than or equal to 2.75 and less than or equal to 3.25, 'b' is greater than or equal to 0.75 and less than or equal to 1.25, and/or 'c' is greater than or equal to 5.75 and less than or equal to 6.25. And in at least one variation 'a' is greater than or equal to 2.8 and less than or equal to 3.2, 'b' is greater than or equal to 0.8 and less than or equal to 1.2, and/or 'c' is greater than or equal to 5.8 and less than or equal to 6.2. In such variations, 'a' can be greater than or equal to 2.85 and less than or equal to 3.15, 'b' can be greater than or equal to 0.85 and less than or equal to 1.15, and/or 'c' can be greater than or equal to 5.85 and less than or equal to 6.15. In at least one variation 'a' is about 3.0, 'b' is about 1.0, and/or 'c' is about 6.0.

The calcium ruthenate $Ca_aRu_bO_c$ can be used as an OER catalyst, for example, to enhance water electrolysis. In the alternative, or in addition to, the calcium ruthenate $Ca_aRu_bO_c$ can be used as an ORR catalyst, for example, to enhance hydrogen fuel cell operation. And in another alternative, or in addition to, the calcium ruthenate $Ca_aRu_bO_c$ can be used as a catalyst for the hydrolysis of hydrogen storing materials such as ammonia and ammonia borane, among others, to enhance to production of molecular hydrogen. The calcium ruthenate $Ca_aRu_bO_c$ according to the teachings of the present disclosure was predicted using an agent-based sequential optimization approach to materials discovery as taught in Montoya, J. H., Winther, K. T., Flores, R. A., Bligaard, T., Hummelshøj, J. S., & Aykol, M. (2020), "Autonomous intelligent agents for accelerated materials discovery", Chemical Science, 11(32), 8517-8532. In addition, the previously unknown compound (i.e., the $Ca_aRu_bO_c$) was synthesized and formed as described in greater detail below. Not being bound by theory, it should be understood that the calcium ruthenate $Ca_aRu_bO_c$ exhibits enhanced catalytic activity at least in part due to the presence of Ru, and given the Ca rich composition of the calcium ruthenate $Ca_aRu_bO_c$ compared to other Ru-containing catalytic materials (e.g., $Ca_3Ru_2O_7$, $CaRuO_3$, $SrRuO_3$, $Ca_2LaRuO_6$, $SrCoRuO_6$, and $SrLaCoRuO_6$), the calcium ruthenate $Ca_aRu_bO_c$ according to the teachings of the present disclosure requires less Ru per gram of material and thus can cost less than other Ru-containing catalytic materials.

Figure 1:
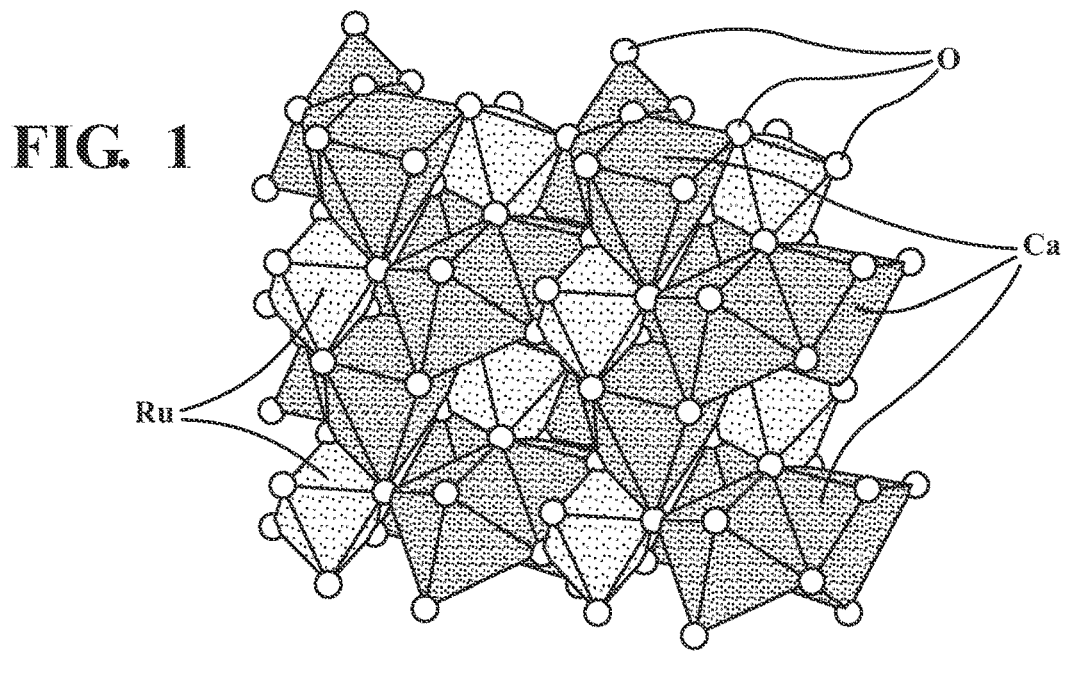
FIG. 1 shows a crystal structure model for the calcium ruthenate $Ca_aRu_bO_c$ according to the teachings of the present disclosure.

Referring to FIG. 1, a crystal structure model for the calcium ruthenate $Ca_aRu_bO_c$ is shown. The polygons 'Ca' represent a calcium atom (i.e., a calcium atom is at the center of each of the heavily shaded polygons identified as 'Ca'), the polygons 'Ru' represent a ruthenium atom (i.e., a ruthenium atom is at the center of each of the lightly shaded polygons identified as 'Ru')), and the spheres represent oxygen atoms. The crystal structure is monoclinic.

Figure 2:
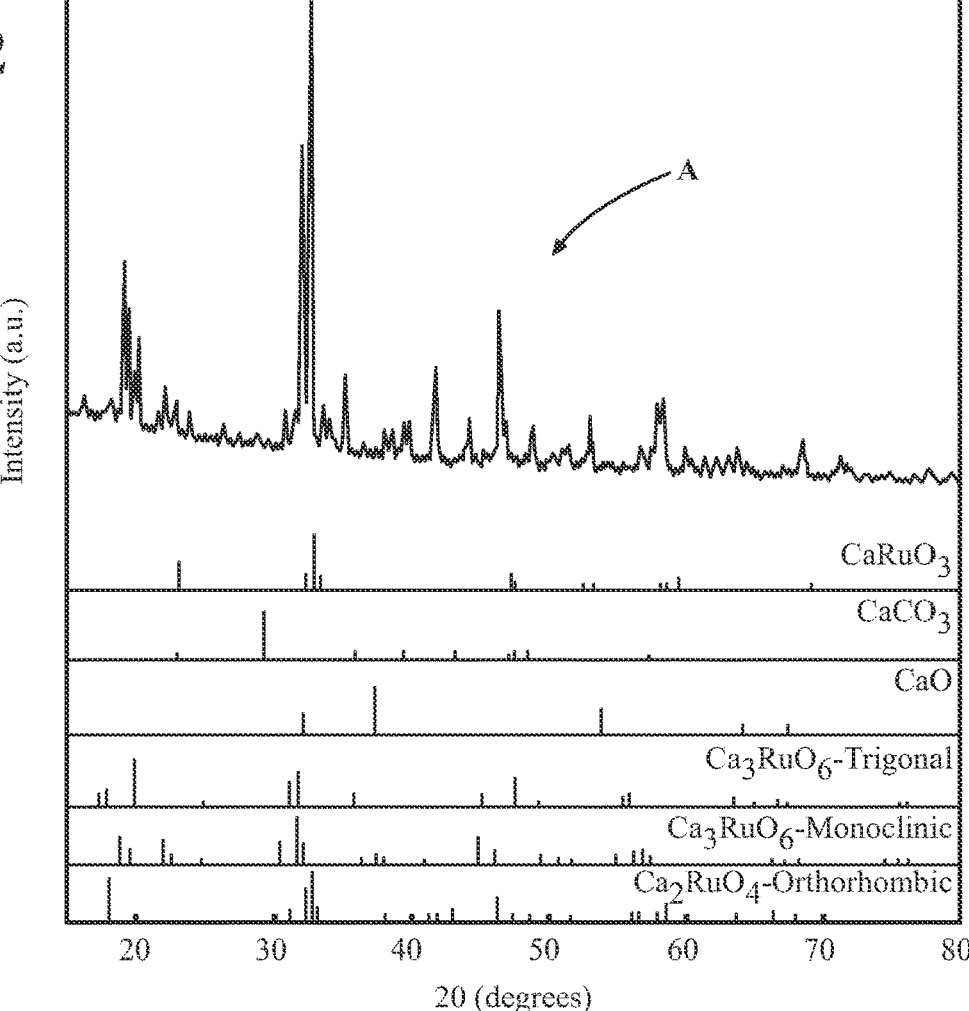
FIG. 2 is an x-ray diffraction (XRD) pattern of the calcium ruthenate $Ca_aRu_bO_c$ according to the teachings of the present disclosure.

Referring to FIG. 2 an XRD plot 'A' of powders comprising the calcium ruthenate $Ca_aRu_bO_c$ according to the teachings of the present disclosure is shown. In addition, FIG. 2 shows simulated XRD patterns generated from published crystallographic data for $CaRuO_3$, $CaCO_3$, and CaO, and calculated XRD peaks for $Ca_3RuO_6$ with a trigonal crystal structure, $Ca_3RuO_6$ with a monoclinic crystal structure, and $Ca_2RuO_4$ with an orthorhombic crystal structure. And as observed from comparing the XRD plot A with the known and calculated XRD peaks listed above, $Ca_3RuO_6$ with a monoclinic crystal structure was present in the powders.

Referring now to FIG. 3, additional confirmation of the presence of the calcium ruthenate $Ca_aRu_bO_c$ according to the teachings of the present disclosure is shown. Particularly, FIG. 3 shows an image of XRD scans of precursor metal carbonate and/or oxide powders (precursor powders) as the precursor powders were heated from room temperature (about 22° C.) to 1100° C. and then cooled from 1100° C. to room temperature. Non-limiting examples of the precursor metal carbonate and oxide powders include $RuO_2$, $CaRuO_3$, $CaCO_3$, $CaO_2$, and CaO. For example, in some variations the precursor powders include $RuO_2$ and $CaCO_3$. And as observed by comparing FIGS. 2 and 3, the XRD peak for $Ca_3RuO_6$ at about 32-33° occurs or appears when the precursor powders reach about 800° C. and disappear when the precursor powders reach about 1100° C. Accordingly, it should be understood that in some variations of the present disclosure the calcium ruthenate $Ca_aRu_bO_c$ is formed by heating an appropriate mixture of metal carbonate and oxide powders to between about 800° C. and about 1000° C.

Referring now to FIGS. 4-6, flow charts for non-limiting examples of methods for making the calcium ruthenate $Ca_aRu_bO_c$ according to the teachings of the present disclosure are shown. In FIG. 4, a method 10 includes mixing precursor components at 100 and forming the calcium ruthenate $Ca_aRu_bO_c$ via precipitation at 110. For example, appropriate metal salts are mixed with or dissolved in water to form a metal salt aqueous solution at 100 and the calcium ruthenate $Ca_aRu_bO_c$ is precipitated out of the solution by adding a precipitation agent (e.g., potassium hydroxide (KOH)) to the solution at 110. In some variations, precipitated particles of the calcium ruthenate $Ca_aRu_bO_c$ are disposed on and/or bonded to a surface of a catalyst support as described below. In FIG. 5, method 12 includes mixing or dissolving appropriate metal salts in water to form a metal salt aqueous solution at 100 and using the metal salt aqueous solution with the incipient wetness impregnation technique at 112 to deposit the calcium ruthenate $Ca_aRu_bO_c$ within a porous catalyst support. And in FIG. 6, method 14 includes mixing powders of appropriate metal carbonates and/or oxides at 100 and heating the mixed powders at 114 such that bulk solid-state reactions result in the formation of the calcium ruthenate $Ca_aRu_bO_c$. As mentioned above, non-limiting examples of the precursor metal carbonate and oxide powders include $RuO_2$, $CaRuO_3$, $CaCO_3$, $CaO_2$, and CaO. For example, and as mentioned above, in some variations the precursor powders were $RuO_2$ and $CaCO_3$, and in at least one variation, powders of $RuO_2$ and $CaCO_3$ with a molar ratio of 1:3 are mixed and heated such that bulk solid-state reactions result in the formation of the calcium ruthenate $Ca_aRu_bO_c$.

In some variations the calcium ruthenate $Ca_aRu_bO_c$ is in the form of microparticles, while in other variations the calcium ruthenate $Ca_aRu_bO_c$ is in the form of nanoparticles. And in at least one variation the calcium ruthenate $Ca_aRu_bO_c$ is the form of microparticles and nanoparticles. As used herein, the term "microparticles" refers to particles with an average outer dimension between 1 micrometer (μm) and 999 μm and the term "nanoparticles" refers to particles with an average outer dimension between 1 nanometer (nm) and 999 nm.

Referring to FIGS. 7A and 7B, two non-limiting examples of providing or forming a layer of the calcium ruthenate $Ca_aRu_bO_c$ according to the teachings of the present disclosure onto a surface of a substrate or support are shown. Particularly, in some variations particles 130 of $Ca_aRu_bO_c$ are used to form a layer 132 of the $Ca_aRu_bO_c$ on a surface 122 of a catalyst support 120 (FIG. 7A), while in other variations a $Ca_aRu_bO_c$ target 140 is used for sputtering and forming a layer 142 of the $Ca_aRu_bO_c$ on the surface 122 of the catalyst support 120 (FIG. 7B). In at least one variation, the layer 132 of the $Ca_aRu_bO_c$ on the surface 122 of the catalyst support 120 is a continuous layer, while in other variations the layer 132 of the $Ca_aRu_bO_c$ on the surface 122 of the catalyst support 120 is a non-continuous layer. Also, in some variations the layer 142 of the $Ca_aRu_bO_c$ on the surface 122 of the catalyst support 120 is a continuous layer, while in other variations the layer 142 of the $Ca_aRu_bO_c$ on the surface 122 of the catalyst support 120 is a non-continuous layer. As used herein, the term "continuous layer" refers to a layer providing complete coverage of a surface (i.e., 100% coverage) and the term "non-continuous layer" refers to a layer providing only partial coverage of a surface (i.e., <100% coverage). In addition, in at least one variation the layer 132 and/or the layer 142 of the $Ca_aRu_bO_c$ includes amorphous $Ca_aRu_bO_c$.

Figure 8A:
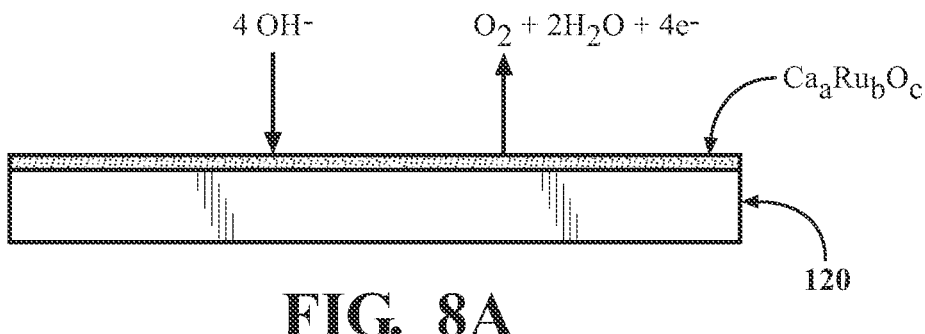
FIG. 8A shows the calcium ruthenate $Ca_aRu_bO_c$ according to the teachings of the present disclosure being used as an oxygen evolution reaction (OER) catalyst.
Figure 8B:
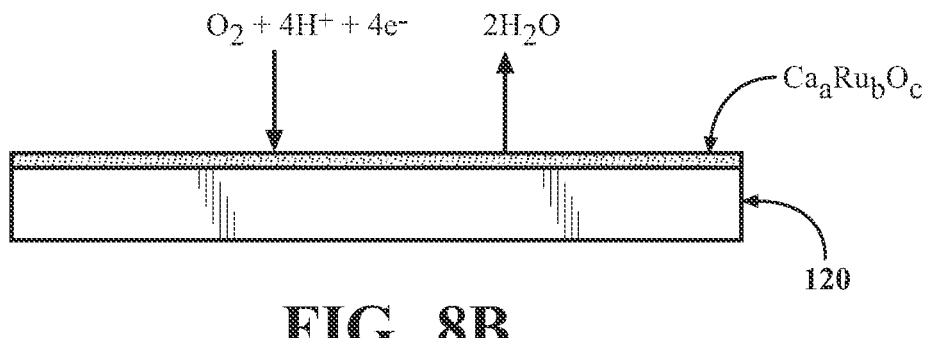
FIG. 8B shows the calcium ruthenate $Ca_aRu_bO_c$ according to the teachings of the present disclosure being used as an oxygen reduction reaction (ORR) catalyst.
Figure 8C:
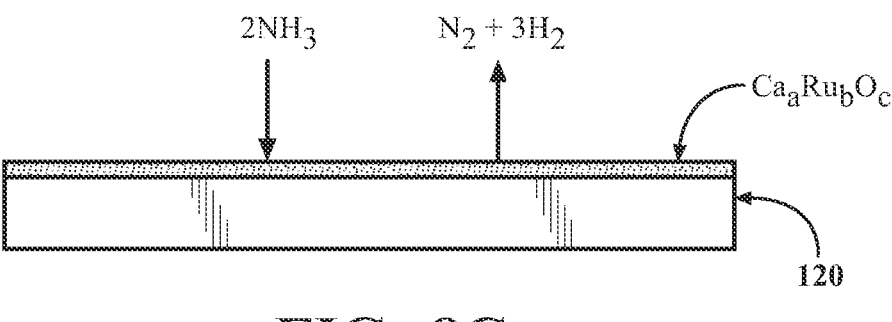
FIG. 8C shows the calcium ruthenate $Ca_aRu_bO_c$ according to the teachings of the present disclosure being used a catalyst for cracking ammonia.

Referring to FIG. 8A, in some variations the $Ca_aRu_bO_c$ is used as an OER catalyst, e.g., for catalyzing hydroxide ions ($OH^-$) to form molecular oxygen ($O_2$) and water ($H_2O$). In the alternative, or in addition to, the $Ca_aRu_bO_c$ is used as an ORR catalyst, e.g., for catalyzing molecular oxygen and hydrogen ions ($H^+$) to form water as shown in FIG. 8B. And in the alternative, or in addition to, the $Ca_aRu_bO_c$ is used as a hydrolysis catalyst for the catalytic decomposition of ammonia as shown in FIG. 8C and/or the catalytic hydrolysis of other hydrogen storage materials.

Not being bound by theory, and with respect to $Ca_aRu_bO_c$ being used as an OER catalyst (FIG. 8A), in some variations the crystalline symmetry of the $Ca_aRu_bO_c$ and/or the electronic structure of the $Ca_aRu_bO_c$, provide enhanced OER activity. For example, in some variations the $Ca_aRu_bO_c$ is a strongly correlated material with an incompletely filled d- or f-electron shell such that an increase in the unoccupied d- or f-electron shell(s) results in crystallographic structure change that decreases the overpotential for the oxygen evolution reaction. Stated differently, and as a non-limiting example, electrons from $OH^-$ ions transfer to the unoccupied d- or f-electron shell(s) of the $Ca_aRu_bO_c$, which in turn results in a crystallographic structure change of the material that enhances the OER activity of the $Ca_aRu_bO_c$.

Regarding $Ca_aRu_bO_c$ being used as an OER catalyst (FIG. 8B), and not being bound by theory, in some variations $O_2$ activation occurs via electrons from the $Ca_aRu_bO_c$ being transferred directly from the $Ca_aRu_bO_c$ surface to excite the neutral $O_2$ molecule to one of its two singlet states or by charging the $O_2$ molecule to a superoxide ion $$(O_2^-)$$

or a peroxide ion $$(O_2^{2-}).$$

And regarding $Ca_aRu_bO_c$ being used as an OER catalyst (FIG. 8C), in some variations the $Ca_aRu_bO_c$ assists in cracking of the ammonia to form nitrogen gas and hydrogen gas.

It should be understood from the teachings of the present disclosure that a new calcium ruthenate composition of matter is provided. The calcium ruthenate has a chemical formula of $Ca_aRu_bO_c$ and the 'a' coefficient is greater than or equal to 2.5 and less than or equal to 3.5 (i.e., $2.5 \leq a \leq 3.5$), for example, greater than or equal to 2.75 and less than or equal to 3.25, greater than or equal to 2.8 and less than or equal to 3.2, or greater than or equal to 2.85 and less than or equal to 3.15. In at least one variation 'a' is about 3.0. The 'b' coefficient is greater than or equal to 0.5 and less than or equal to 1.5 (i.e., $0.5 \leq b \leq 1.5$), for example, greater than or equal to 0.75 and less than or equal to 1.25, greater than or equal to 0.8 and less than or equal to 1.2, or greater than or equal to 0.85 and less than or equal to 1.15. In at least one variation, 'b' is about 1.0. The 'c' coefficient is greater than or equal to 5.5 and less than or equal to 6.5 (i.e., $5.5 \leq c \leq 6.5$), for example, greater than or equal to 5.75 and less than or equal to 6.25, greater than or equal to 5.8 and less than or equal to 6.2, or greater than or equal to 5.85 and less than or equal to 6.15. In at least one variation 'c' is about 6.0. It should also be understood that in some variations the amounts (concentrations) of Ca, Ru, and O in the calcium ruthenate composition are independent of each other.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A calcium ruthenate composition of matter comprising:
a compound of calcium, ruthenium and oxygen with a chemical formula consisting of $Ca_aRu_bO_c$, wherein:
    a is greater than or equal to 2.5 and less than or equal to 3.5;
    b is greater than or equal to 0.5 and less than or equal to 1.5; and
    c is greater than or equal to 5.5 and less than or equal to 6.5.

2. The calcium ruthenate composition of matter according to claim 1, wherein:
    a is greater than or equal to 2.75 and less than or equal to 3.25;
    b is greater than or equal to 0.75 and less than or equal to 1.25; and
    c is greater than or equal to 5.75 and less than or equal to 6.25.

3. The calcium ruthenate composition of matter according to claim 1, wherein:
    a is greater than or equal to 2.8 and less than or equal to 3.2;
    b is greater than or equal to 0.8 and less than or equal to 1.2; and
    c is greater than or equal to 5.8 and less than or equal to 6.2.

4. The calcium ruthenate composition of matter according to claim 1, wherein:
    a is about 3.0;
    b is about 1.0; and
    c is about 6.0.

5. The calcium ruthenate composition of matter according to claim 1, wherein the compound of calcium, ruthenium, and oxygen is an oxygen catalyst.

6. The calcium ruthenate composition of matter according to claim 5, wherein the compound of calcium, ruthenium, and oxygen is an oxygen evolution reaction catalyst.

7. The calcium ruthenate composition of matter according to claim 5, wherein the compound of calcium, ruthenium, and oxygen is an oxygen reduction reaction catalyst.

8. The calcium ruthenate composition of matter according to claim 5, wherein the compound of calcium, ruthenium, and oxygen is a catalyst for hydrolysis of a hydrogen containing compound.

9. The calcium ruthenate composition of matter according to claim 5 further comprising a catalyst support, wherein the compound of calcium, ruthenium, and oxygen is bonded to a surface of the catalyst support.

10. The calcium ruthenate composition of matter according to claim 9, wherein the compound of calcium, ruthenium, and oxygen comprises particles of $Ca_aRu_bO_c$ bonded to the surface of the catalyst support.

11. The calcium ruthenate composition of matter according to claim 10, wherein the particles of $Ca_aRu_bO_c$ comprise at least one of microparticles of $Ca_aRu_bO_c$ and nanoparticles of $Ca_aRu_bO_c$.

12. The calcium ruthenate composition of matter according to claim 10, wherein the particles of $Ca_aRu_bO_c$ comprise amorphous $Ca_aRu_bO_c$.

13. The calcium ruthenate composition of matter according to claim 9, wherein the compound of calcium, ruthenium, and oxygen comprises a sputtered layer of $Ca_aRu_bO_c$.

14. The calcium ruthenate composition of matter according to claim 13, wherein the sputtered layer of $Ca_aRu_bO_c$ comprises amorphous $Ca_aRu_bO_c$.

15. A catalyst comprising:
an amorphous compound of calcium, ruthenium and oxygen with a chemical formula of $Ca_aRu_bO_c$, wherein:
    a is greater than or equal to 2.5 and less than or equal to 3.5;
    b is greater than or equal to 0.5 and less than or equal to 1.5; and
    c is greater than or equal to 5.5 and less than or equal to 6.5.

16. The catalyst according to claim 15 further comprising a catalyst support, wherein the amorphous compound of calcium, ruthenium and oxygen is bonded to a surface of the catalyst support.

17. The catalyst according to claim 16, wherein:
    a is greater than or equal to 2.75 and less than or equal to 3.25;
    b is greater than or equal to 0.75 and less than or equal to 1.25; and
    c is greater than or equal to 5.75 and less than or equal to 6.25.

18. The catalyst according to claim 17, wherein the amorphous compound of calcium, ruthenium and oxygen bonded to the surface of the catalyst support is at least one of microparticles of $Ca_aRu_bO_c$, nanoparticles of $Ca_aRu_bO_c$, and a sputtered layer of $Ca_aRu_bO_c$.

19. A catalyst comprising:
a catalyst support and nanoparticles of a compound of calcium, ruthenium and oxygen disposed on a surface of the catalyst support, wherein the nanoparticles are bonded to a surface of the catalyst support and have a chemical formula of $Ca_aRu_bO_c$ with 'a' greater than or equal to 2.5 and less than or equal to 3.5, 'b' greater than or equal to 0.5 and less than or equal to 1.5, and 'c' greater than or equal to 5.5 and less than or equal to 6.5.

20. The catalyst according to claim 19, wherein:
    a is greater than or equal to 2.85 and less than or equal to 3.15;
    b is greater than or equal to 0.85 and less than or equal to 1.15; and
    c is greater than or equal to 5.85 and less than or equal to 6.15.

\* \* \* \* \*